March 14, 1933.  E. E. WHITE  1,901,017
AUTOMATIC TIRE INFLATER FOR VEHICLES
Filed Sept. 25, 1930   10 Sheets-Sheet 1

INVENTOR
E.E. WHITE
BY Hazard and Miller
ATTORNEYS

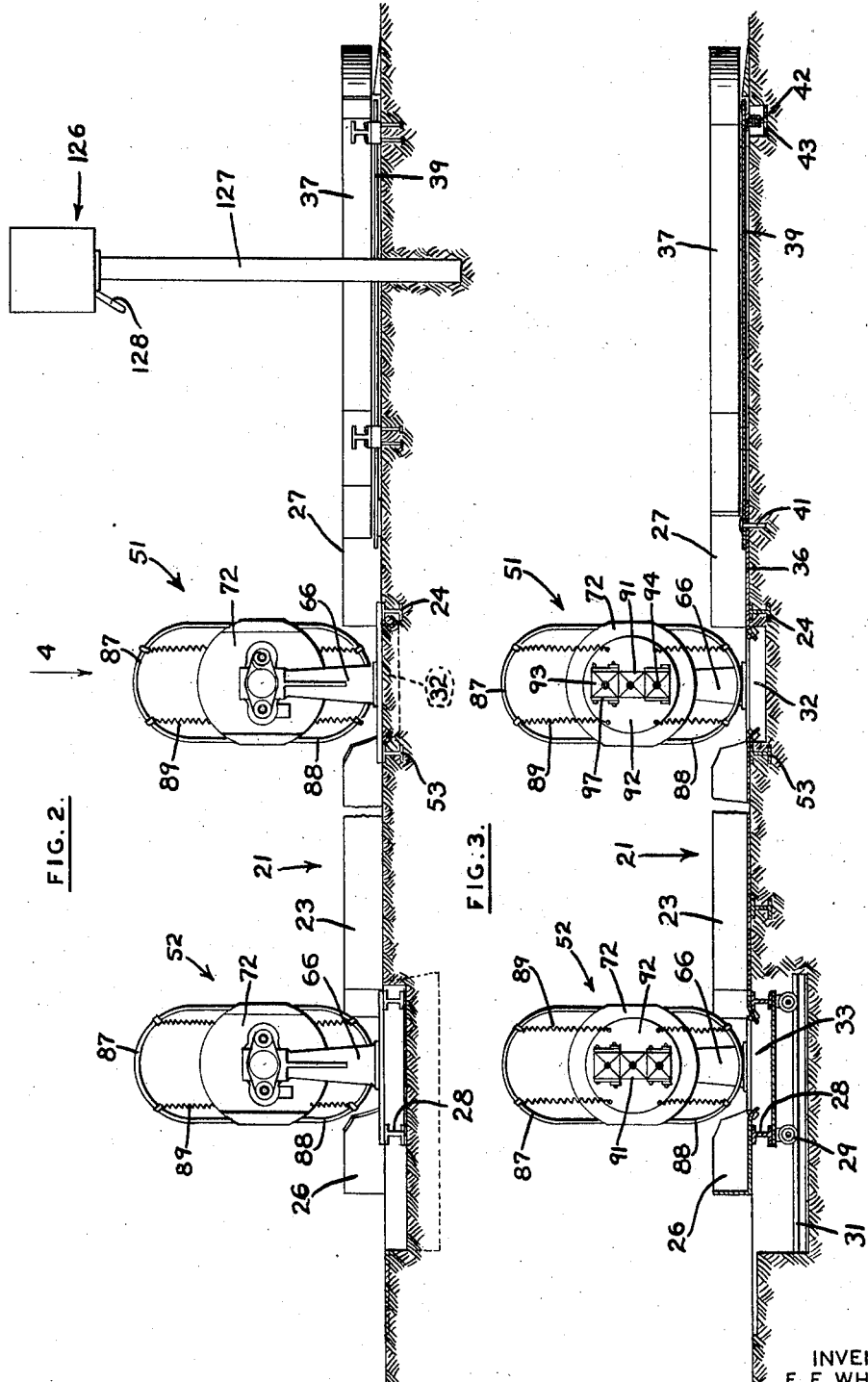

March 14, 1933.  E. E. WHITE  1,901,017
AUTOMATIC TIRE INFLATER FOR VEHICLES
Filed Sept. 25, 1930   10 Sheets-Sheet 3

INVENTOR
E.E. WHITE
BY
ATTORNEYS

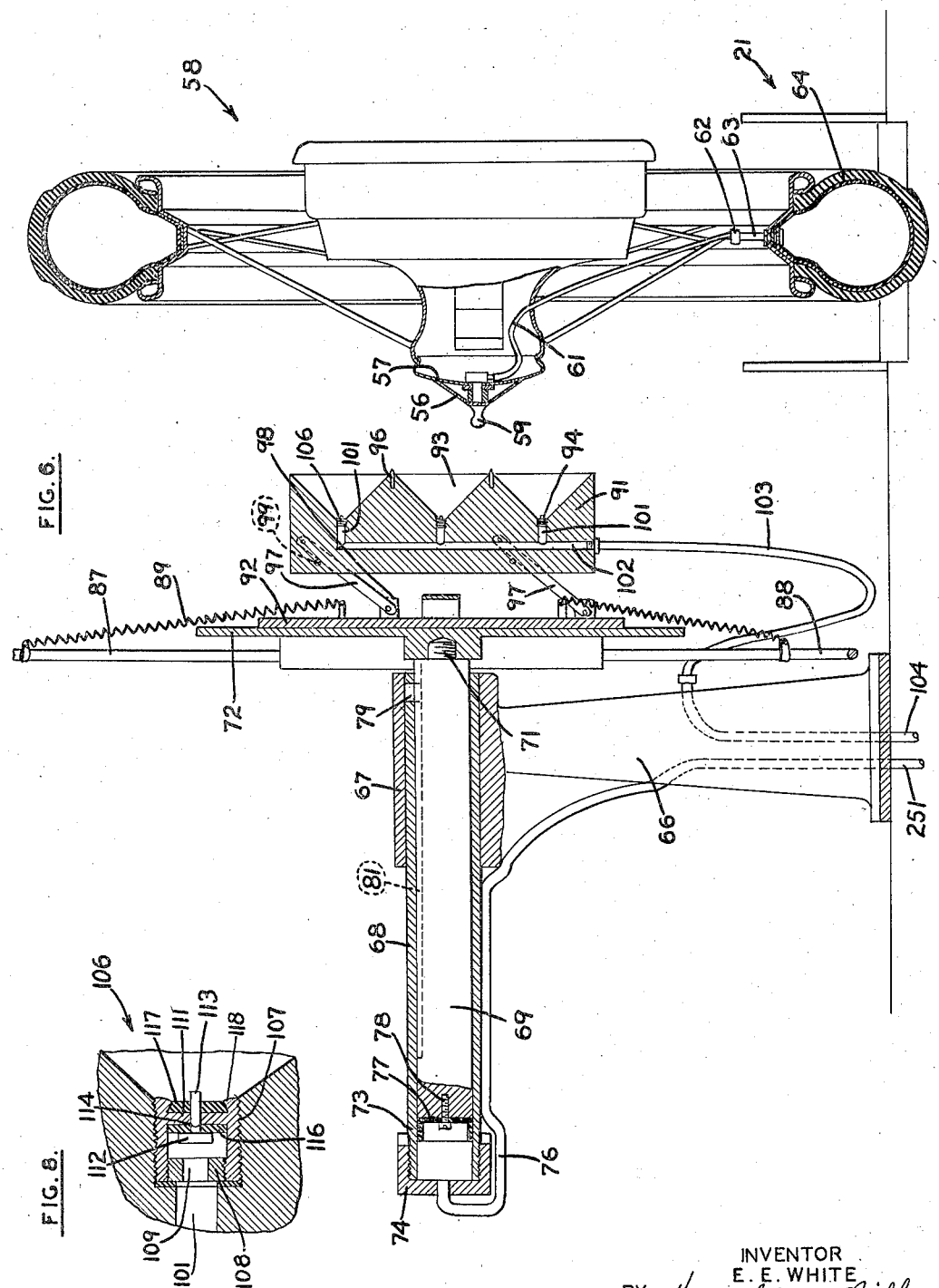

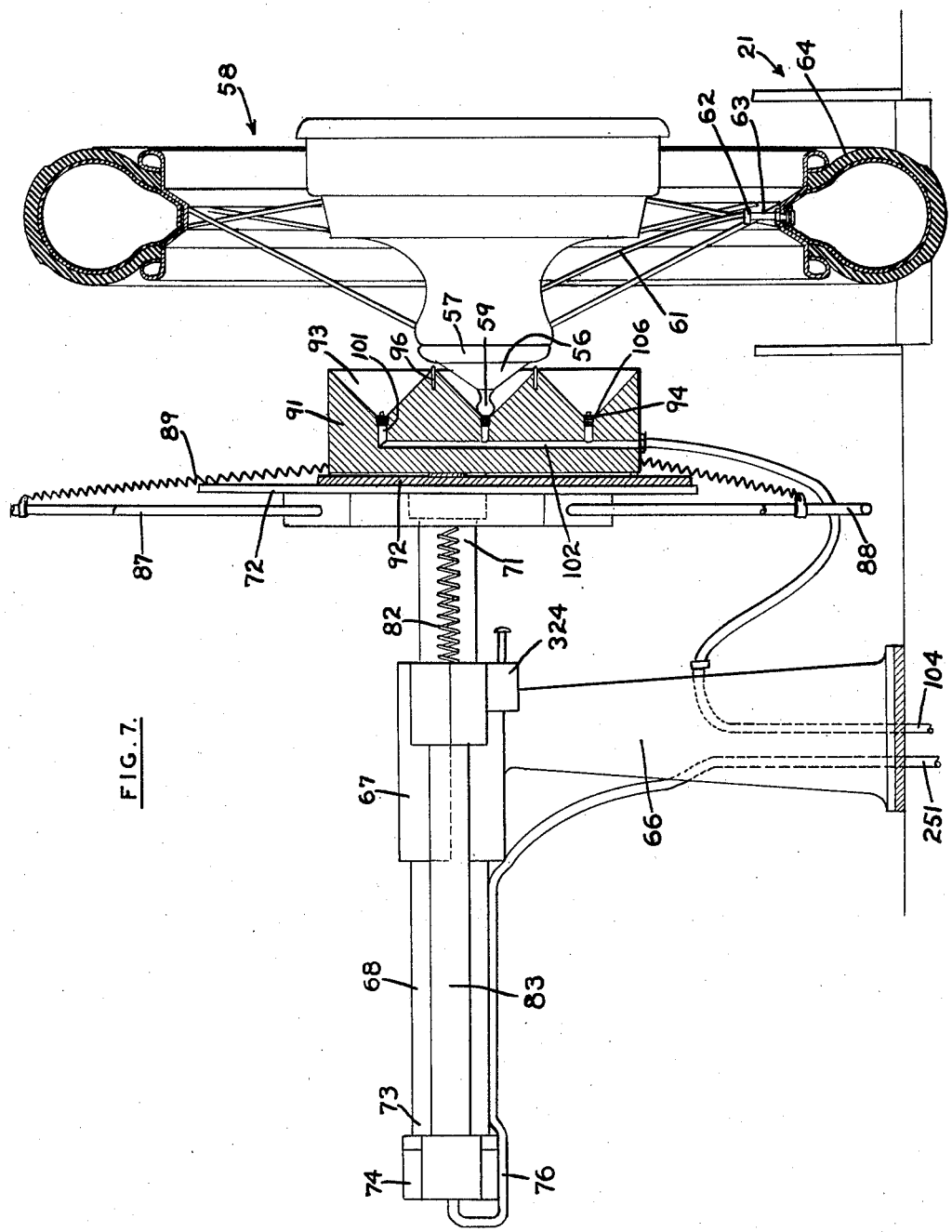

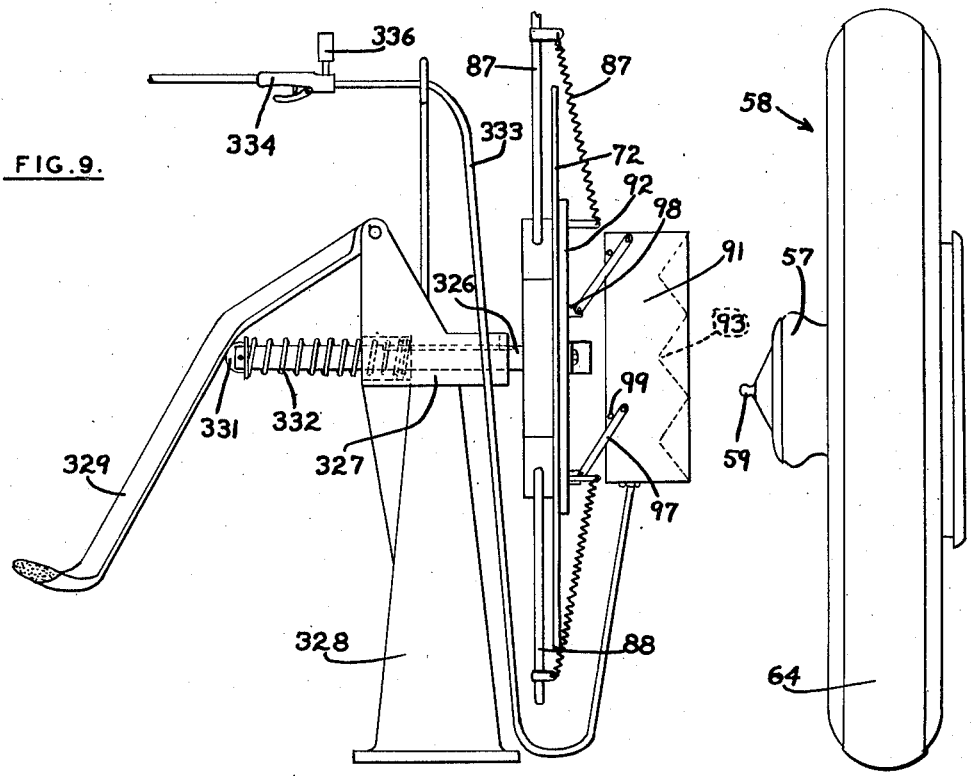
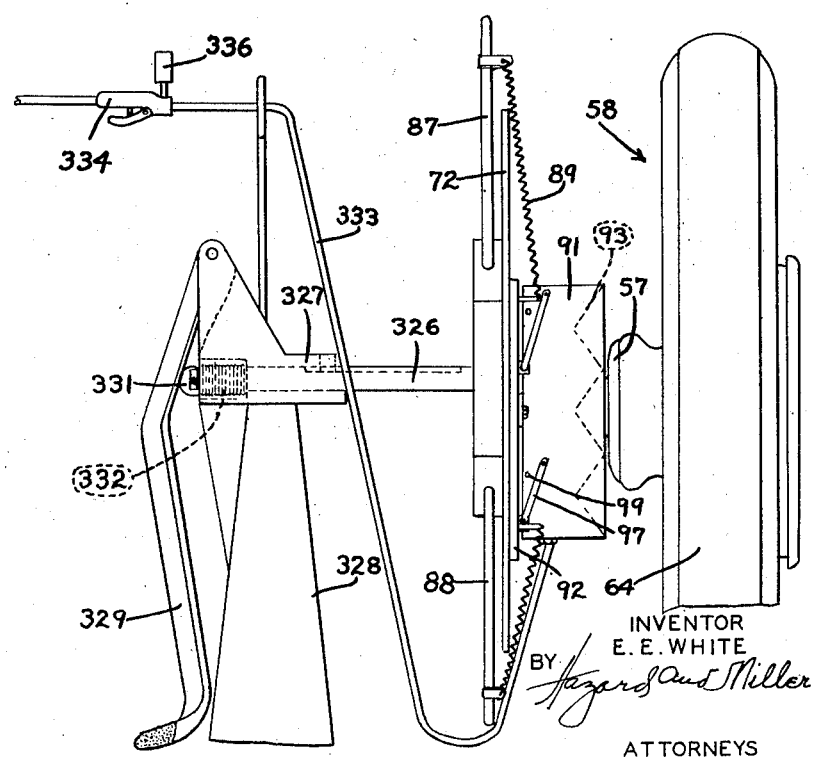

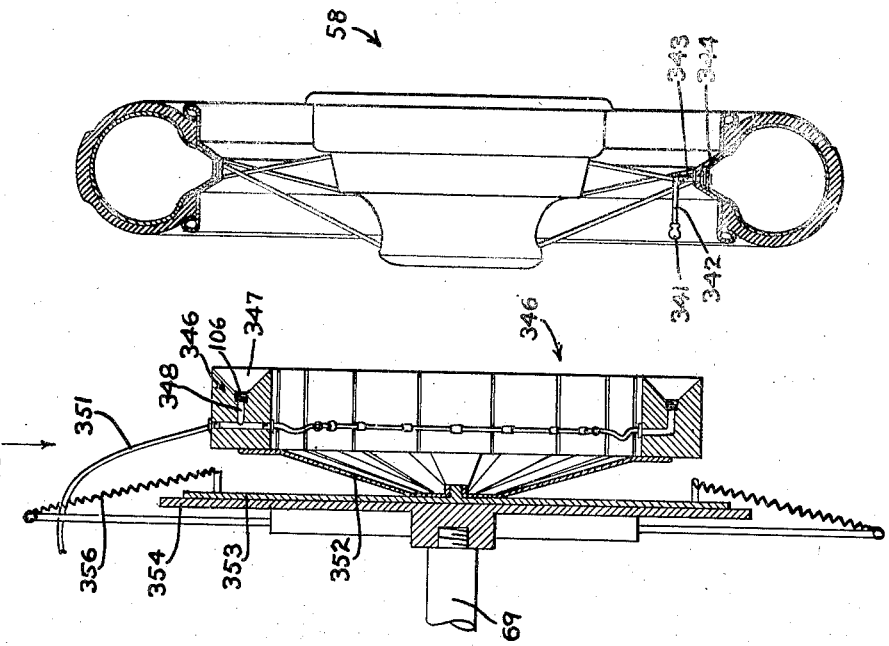
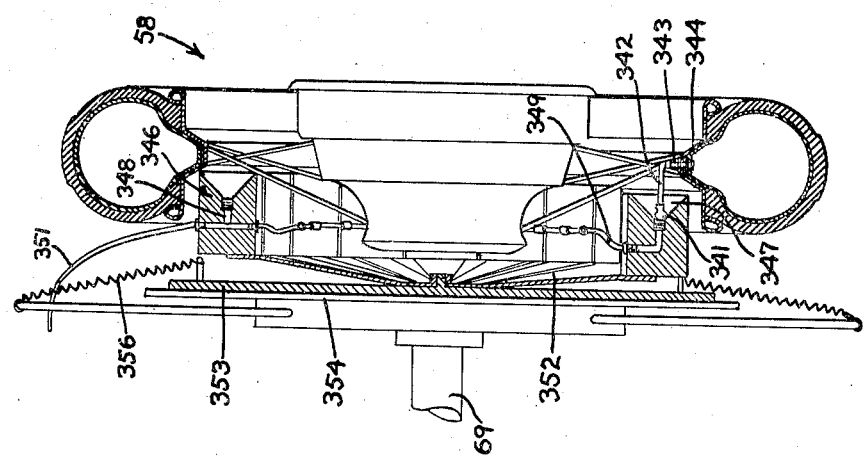

March 14, 1933.     E. E. WHITE     1,901,017
AUTOMATIC TIRE INFLATER FOR VEHICLES
Filed Sept. 25, 1930     10 Sheets-Sheet 8

INVENTOR
E. E. WHITE
BY
ATTORNEYS

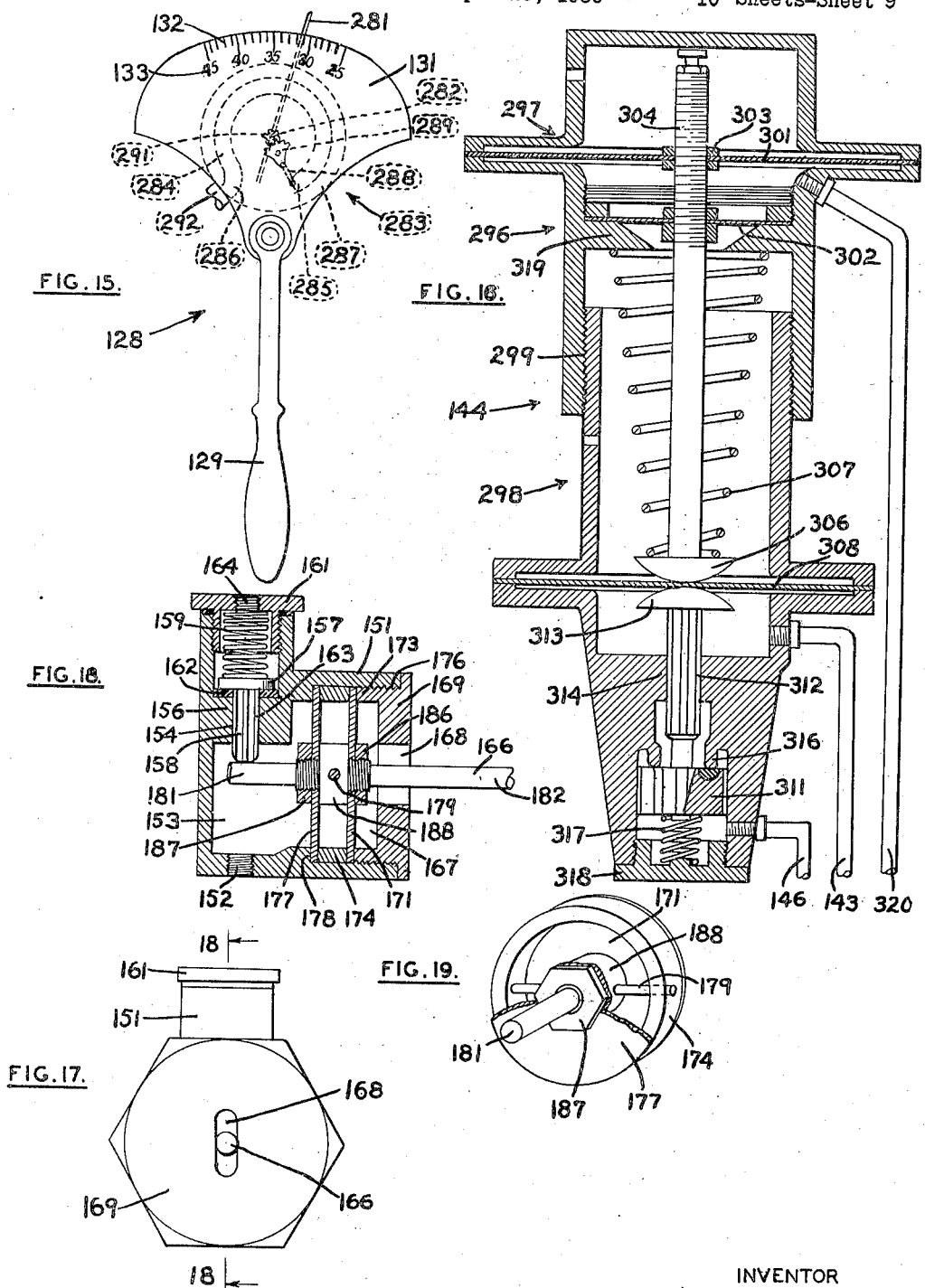

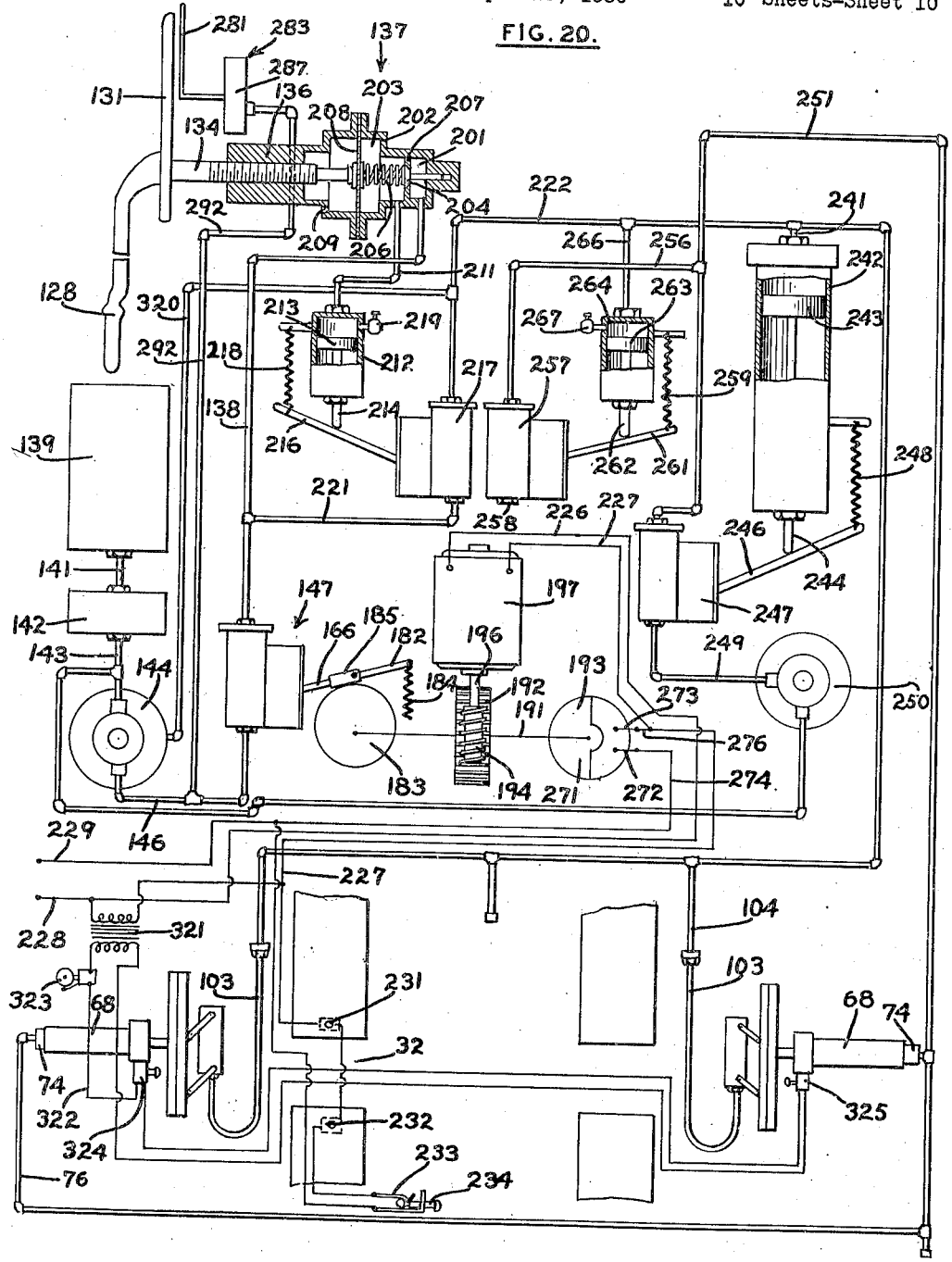

Patented Mar. 14, 1933

1,901,017

UNITED STATES PATENT OFFICE

ELLIS EDMOND WHITE, OF LOS ANGELES, CALIFORNIA, ASSIGNOR TO PNEUMATIC TIRE INFLATING DEVICES CORPORATION, OF LOS ANGELES, CALIFORNIA, A CORPORATION OF CALIFORNIA

AUTOMATIC TIRE INFLATER FOR VEHICLES

Application filed September 25, 1930. Serial No. 484,419.

This invention relates to tire inflating machinery and has for an object the provision of a machine whereby one or all of the pneumatic tires of an automobile or other vehicle may automatically be inflated to predetermined pressure.

A more detailed object is the provision of a tire inflating machine whereby the driver of an automobile may effect inflation of the tires of his car to suitable pressure without the necessity of leaving the driver's seat and without requiring the services of anyone outside the car.

Another object is to so construct the machine that each operator thereof may select for himself the pressure to which his tires are to be inflated, the means for regulating the inflating machine being also easily accessible from the driver's compartment of the automobile.

A more detailed object is to provide a tire inflating machine comprising a runway upon which an automobile may be driven, inflating heads disposed thereadjacent, and means accessible from the driver's compartment of the automobile for regulating the pressure to which the tires are to be inflated. The arrival of the automobile in that position in which its wheels are in alignment with the inflating heads automatically starts the inflating machine in operation, causing the inflating heads to be advanced into proper engagement with inlet means associated with the tires to be inflated, the conduction of air to the inflating heads until the pressure within the several tires being inflated has reached that for which the regulating means has previously been set, and then the retraction of the inflating heads permitting the automobile to be driven off the runway.

A further object is to provide means for compensating for differences in the initial pressures of the several tires to be inflated so that subsequent to operation of the inflating machine all the tires inflated at one time will be inflated to precisely the same pressure.

A still further object is to provide an inflating machine of the general character described which is capable of carrying out the functions hereinabove described expeditiously and with a high degree of accuracy and yet which is of a relatively simple nature, being composed of relatively few parts, each of which may be so constructed that wherever friction occurs the parts may readily be replaced with a minimum of time and expense.

The invention possesses other objects and advantageous features, some of which, with those enumerated, will be set forth in the following description of the invention's particular embodiments which are illustrated in the drawings accompanying and forming a part of the specification.

Referring to the drawings:

Fig. 2 is a view in side elevation, the direction of view being indicated by the arrow 2 of Fig. 1.

Fig. 3 is a longitudinal, vertical, sectional view taken upon the line 3—3 of Fig. 1, with the direction of view as indicated.

Fig. 6 is an enlarged, longitudinal, medial, vertical, sectional view of the inflating head, and an automobile wheel disposed there-adjacent in substantially their respective positions prior to engagement of the inflating head with the wheel, the tire of which is to be inflated. This view may be considered as having been taken upon the line 6—6 of Fig. 4, with the direction of view as indicated.

Fig. 7 is a view similar to Fig. 6 but showing the operating head in actual engagement with the wheel in substantially the position assumed thereby during inflation of the tire.

Fig. 8 is an enlarged, detailed view showing the valve construction used in conjunction with each of the sockets of the inflating head; portions of the figure are broken away to reduce its size.

Fig. 9 is a view similar to Fig. 6 but showing a slightly modified form of inflating head in substantially the position assumed thereby prior to engagement with the wheel.

Fig. 10 is a view similar to Fig. 9 but showing the head advanced into engaging position.

Fig. 11 is another view similar to Fig. 6 but showing a further modified form of inflating head and the modified form of inlet means for the tire to be inflated, which is to be used in conjunction therewith.

Fig. 12 is a view similar to Fig. 11 but showing the inflating head engaged with the inlet means.

Fig. 15 is a detailed view showing in front elevation the control handle which is accessible from the driver's compartment of the automobile, the tires of which are to be inflated, and whereby the driver may predetermine the pressure to which the tires will be inflated by the machine.

Fig. 16 is a detailed view in medial section of an improved type of pressure regulator whereby the operation of the inflating machine is materially improved.

Fig. 17 is a view in end elevation of an improved type of valve, the use of which also materially improves operation of the inflating machine.

Fig. 18 is a sectional view taken upon the line 18—18 of Fig. 17, with the direction of view as indicated.

Fig. 19 is a view in perspective of the operating lever for the valve of Figs. 17 and 18, and the pivotal mounting therefor.

Fig. 20 is an electro-mechanical diagram of an entire inflating machine adapted to inflate only two tires at a time, although it is provided with couplings whereby two additional inflating heads may be connected thereto to permit simultaneous inflation of all four tires of a vehicle.

In terms of broad inclusion the device of the present invention comprises an automatic inflating machine whereby the pneumatic tires of an automobile or other vehicle may be inflated to any desired pressure without the service of any attendant, and without the necessity of the driver leaving the driver's compartment. Means are provided accessible to the hand of the driver while seated within his car, whereby he may set the machine to effect inflation of his tires to the desired pressure, after which the operation of the machine is entirely automatic, the connection of the inflating heads with the various tires, the inflation of the tires, and the retraction of the inflating heads being carried out entirely automatically and in an absolute minimum of time.

Figure 1:
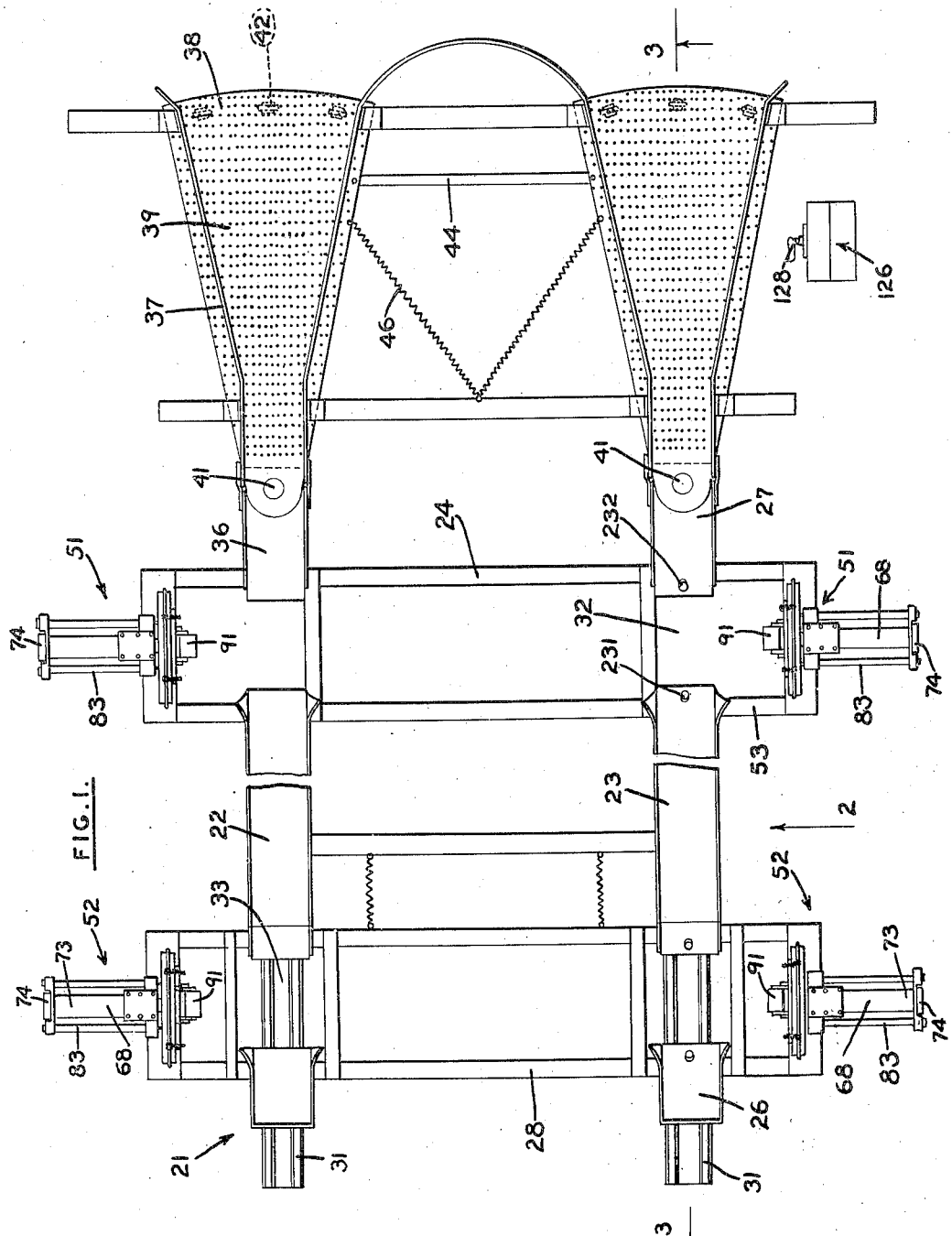
Fig. 1 is a top plan view of an inflating machine constructed in accordance with the principles of the present invention.
Figure 4:
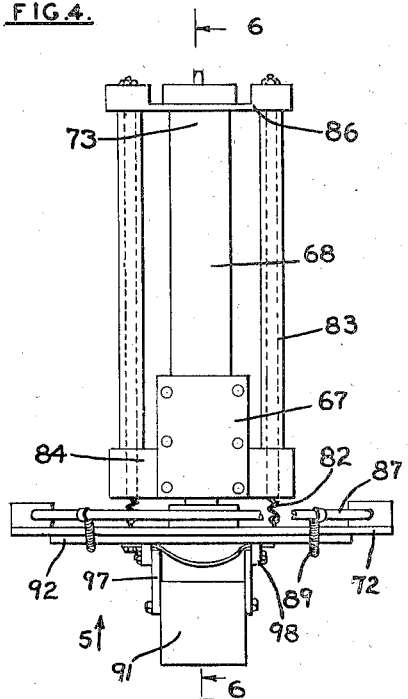
Fig. 4 is a top plan view of one of the inflating heads, the direction of view being indicated by the arrow 4 of Fig. 2.
Figure 5:
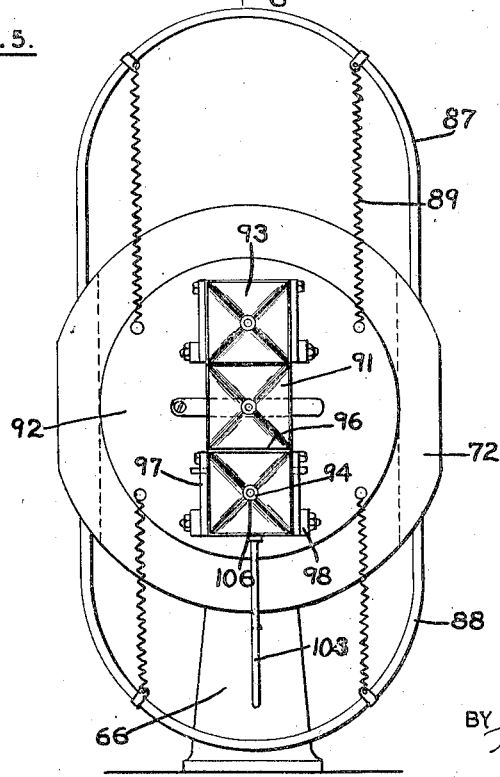
Fig. 5 is a front elevation of the inflating head of Fig. 4, the direction of view being indicated by the arrow 5 of that figure.
Figure 13:
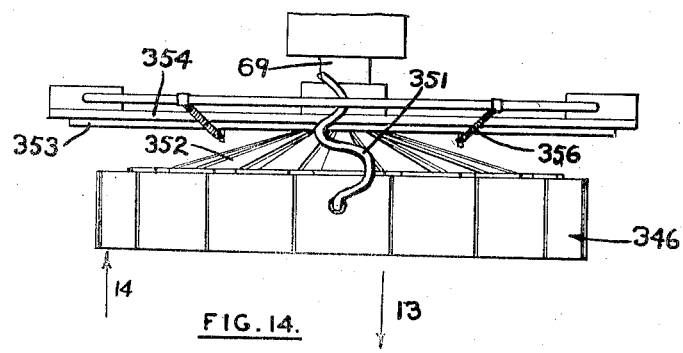
Fig. 13 is a top plan view of the inflating head of Figs. 11 and 12, the direction of view being indicated by the arrow 13 of Fig. 11.
Figure 14:
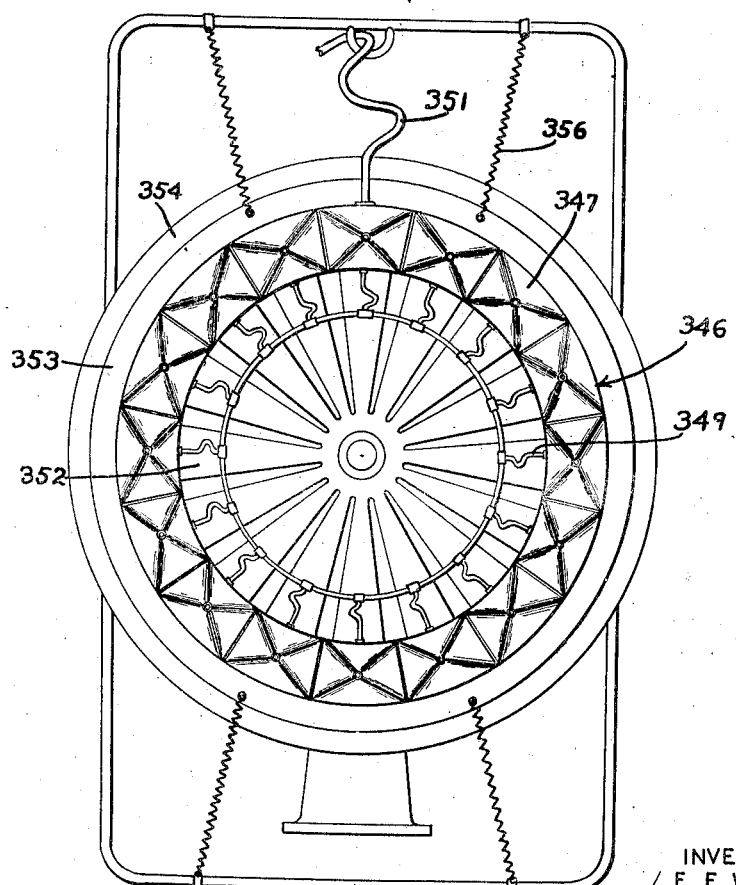
Fig. 14 is a front elevation, the direction of view being indicated by the arrow 14 of Fig. 13.

Specifically describing the invention in one of its preferred embodiments, Figs. 1, 2, and 3 disclose a runway 21 in the form of a pair of spaced parallel channels 22 and 23, suitably supported and braced with respect to each other by a plurality of transverse bars 24, whereby the channels 22 and 23 are retained in such position that an automobile or similar vehicle may be driven thereupon with both wheels on each side of the vehicle within or substantially in registry with one of the channels. Each of the channels 22 and 23 comprises forward and rear sections 26 and 27 respectively, the rear section 27 being stationary and the forward section 26 being carried by a slidable frame 28 mounted upon rollers 29, which in turn rest upon a track 31 sunk below the surface of the ground, thereby permitting increase in the effective length of the runway 21 to accommodate cars of different wheel base. When an automobile drives upon the runway 21 the front wheels thereof will first drop into slight depressions 32 in the after sections 27 of the channels 22 and 23. The car should be driven forward from this position, however, causing the front wheels to roll out of the depressions 32 and onto the forward sections 26, permitting the front wheels to drop into similar depressions 33 therein. In the event that the wheel base of the car is longer than the minimum distance between the depressions 32 and 33, the car should be driven further forward until the rear wheels drop into the depressions 32. This will cause the forward sections 26 of the channels 22 and 23, and the frame 28 upon which they are mounted, to be carried forward, with the result that when the car is finally positioned upon the runway 21 each of its wheels will rest within one of the depressions 32, 33.

In order to facilitate bringing the wheels of the automobile into alignment with the channels 22 and 23 the bottoms 36 of the after sections 27 of the channels terminate short of the side flanges 37, which diverge to define relatively wide throats 38, into which the wheels of the vehicle may be driven. The bottoms of these throats 38 are defined by substantially sector shaped plates 39, each of which is pivoted, as by a pivot pin 41, to the bottom 36 of the associated channel 22 or 23 as the case might be. The outer ends of the plates 39 are supported upon rollers 42, which rest upon sunken arcuate tracks 43, permitting the plates 39 to swing about the axes of their respective pins 41, as will readily be understood. The plates 39 are joined by a link 44, which is pivoted at each end to one of the plates; and coil springs 46 under tension between the plates 39 and one of the transverse rigid bars 24 tend to retain the plates 39 substantially midway between their two extremes of movement. Consequently, when a vehicle is driven upon the runway 21 with the wheels thereof not quite in alignment with the channels each wheel will strike one of the flaring side walls 37, and as forward motion of the car continues will be pushed laterally thereby until it comes into registry with the associated channel. However, this lateral movement of the wheel is not accompanied by friction of the tire of that wheel with its supporting surface, inasmuch as the sector shaped plate 39 upon which the wheel rests, is permitted to move laterally with the wheel.

Associated with each of the depressions 32 and 33 are inflating heads 51 and 52, respectively, disposed with suitable clearance at the sides of the runway 21, so as to permit driving an automobile thereupon without danger of striking any of the heads. These heads are arranged in opposed relationship facing toward the runway 21, the forward heads 52 being carried by the movable framework 28, and the after heads 51 being rigidly mounted upon extensions 53 of two adjacent stationary transverse bars 24. Inasmuch as these heads are preferably of identical construction, it will suffice for the purpose of the present disclosure to describe but one of them.

One embodiment of inflating head is illustrated upon Figs. 4 to 7 inclusive. This inflating head is intended to be used in conjunction with the coupling device which is illustrated and described in my co-pending application, Serial No. 473,389, filed August 6, 1930, and which comprises preferably a conical shield 56 carried upon or in the place of a conventional hub cap 57 of an automobile wheel 58. Hence a small spherical male coupling member 59 which is carried by the shield 56 is disposed coaxially with respect to the wheel 58. Ports (not shown) in the outer surface of the spherical coupling member 59 are in communication by means of a suitable passageway with a tube 61, which is preferably removably connected by any suitable coupling device 62 with the valve stem 63 which communicates with the interior of the pneumatic tire 64 of the wheel 58, with the result that when air under pressure is forced into the ports it will be conducted to the interior of the pneumatic tire 64. The valve stem 63 carries a conventional valve (not shown) whereby air is permitted to enter the tire 64, but is restrained against escape therefrom.

Each of the inflating heads 51, 52 which is to cooperate with the male coupling member 59 comprises a rigid standard 66 carrying a tubular sleeve 67 at its upper end, the axis of which is disposed transversely with respect to the runway 21. Rigidly mounted within this sleeve 67 is an elongated cylinder 68 having a plunger 69 reciprocably disposed therein. The inner end 71 of the plunger 69 projects from the associated end of the cylinder 68 and carries a backing plate 72 which is disposed in a vertical plane.

The outer end 73 of the cylinder 68 is closed by a preferably removable head 74, to which a suitable conduit 76 leads. This conduit 76, which will be termed hereinafter as the "head advancing conduit" communicates with the interior of the cylinder 68 and leads thence downwards preferably through the standard 66 into the ground, and to the automatic pressure controlling mechanism which will be described hereinbelow. The inner end of the plunger 69 carries a cup leather 77 which is retained in position upon the plunger 69 by means of a cap screw 78. It will readily be understood, therefore, that when pressure is supplied through the conduit 76 to the cylinder 68 the plunger 69 will be forced therefrom, carrying the backing plate 72 inwards toward the runway 21. The plunger 69 and backing plate 72 are restrained against rotation with respect to the cylinder 68 and the standard 66 by means of a feather key 79 which is rigid with the cylinder 68, and slidably disposed within an elongated feather way 81 in the plunger 69. The backing plate 72 is urged to retracted position by means of a pair of coil springs 82, each of which is preferably disposed within a tubular casing 83 supported upon the standard 66 by means of inner and outer brackets 84 and 86 respectively.

The backing plate 72 carries preferably a pair of relatively light frames 87 and 88, to each of which preferably a pair of coil springs 89 is attached. These springs serve to support a block 91 and a plate 92, the latter of which is in sliding engagement with the face of the backing plate 72. Whereas the springs 89 tend to retain the block 91 substantially centrally of the backing plate 72, it will readily be understood that the sliding plate 92 and the block 91 associated therewith may slide universally with respect to the backing plate 72, and thus position one of preferably a plurality of sockets 93 which are arranged in the exposed inner face of the block 91, in registry with the male coupling member 59.

Each of the sockets 93 tapers inwards substantially to an apex 94, with the result that as the plunger 69 is forced inwards toward the runway 21, causing the male coupling member 59 to seat within one of the sockets 93, the spherical surface of the male coupling 59 will engage the inclined wall of one of the sockets 93 and wedge the block 91 in that direction, which will cause the coupling 59 to seat within the apex 94 of that socket, sliding the slidable plate 92 across the surface of the backing plate 72 to permit the block 91 to conform itself to the position of the hub 57 of the wheel 58, the tire 64 of which is to be inflated. Owing to the fact that automobile wheels are not all of the same diameter, I prefer to employ a plurality, preferably three, sockets 93 arranged in vertical alignment, as best shown upon Fig. 5. However, inasmuch as there is a possibility that when the block 91 is advanced the crest between two adjacent sockets 93 might come into engagement with the extreme outer portion of the spherical male coupling member 59, thus preventing the development of any wedging action to cause the block 91 to be slid either laterally or vertically or both, I have provided means for insuring movement of the block 91 when such engagement occurs, so as to insure seating of the ball 59 within one of the sockets 93. In the first place, an insert 96 of suitable metal is positioned at each of the crests between two adjacent sockets 93, and each of these inserts 96 is provided with a relatively sharp outer edge, thereby reducing to an absolute minimum the flat portion of the block 91 which might come into contact with the outer portion of the ball 59, and thus prevent the development of the necessary wedging action. As an extra precaution against permitting the ball 59 to center itself upon one of the crests between two adjacent sockets 93, the block 91 is mounted upon the sliding plate 92 by means of a plurality of, preferably four, parallel links 97, each of which is pivoted at one end to a lug 98 carried by the sliding plate 92, and at its outer end upon a side of the block 91. The block 91 is provided with one or more pins 99 projecting from a side thereof in position to engage one of the links 97 and limit outward and downward movement of the block 91 with respect to the sliding plate 92. However, should one of the crests between two adjacent sockets 93 strike the exact center of the ball 59 when thrust outwards by the plunger 69, continued outward motion of the backing plate 72 will cause the block 91 to be moved upwards slightly, owing to the pivotal motion of the parallel links 97, upon which the block 91 is supported. Obviously this will cause the ball 59 to drop into the socket 93 immediately below the crest upon which it had engaged, and as soon as the ball has moved off the crest it will strike the inclined surface of the socket 93 therebelow, and develop the wedging action which will cause the block 91 to move still further upwards as the ball 59 slides toward the apex 94 of that socket.

A passageway 101 communicates with the apex 94 of each socket 93, and a manifold passageway 102 communicates with all the passageways 101. A flexible conduit 103 communicates with the passageway 102, and with a suitable supply conduit 104 which extends downwards into the ground preferably through the standard 66, and thence to the automatic pressure controlling mechanism which will be described hereinbelow. A valve 106 is seated within the apex 94 of each socket 93 to prevent the escape of air from the associated passageway 101, except when the male coupling member 59 is seated therein. This valve, which is illustrated in detail upon Fig. 8, comprises a tubular casing 107 adapted to be threaded into the end of the passageway 101, and having a ferrule 108 threaded into its inner end. A port 109 in the ferrule 108 establishes communication between the passageway 101 and the interior of the casing 107. A web 111 extends across the casing 107 adjacent its outer end, and slidably supports a valve 112, a stem 113 of which extends slidably through a port 114 in the web 111. A gasket 116 encircles the port 114 lying against the inner face of the web 111, and a gasket 117 also encircles the port 114, but is retained against the outer face of the web 111 by means of an annular flange 118 extending inwards from the end of the casing 107. When the valve 112 moves to its outer extremity of movement it engages the inner gasket 116 and prevents flow of air through the port 114. However, when the valve 112 is moved inwards away from the gasket 116 air is permitted to flow through the port 114, it being understood that the stem 113 is either flattened or fluted, so that its cross sectional area is materially less than that of the port 114. The stem 113 is of such length that it projects past the gasket 117; consequently, just prior to seating of the ball 59 within the apex 94 of one of the sockets 93 it will engage the stem 113 of the associated valve 112, unseating that valve and permitting air to flow from the associated passageway 101. Air will rush from the valve 106 at sufficient velocity to blow any dirt off the ball 59 before the ball seats tightly against the gasket 117, after which air will flow through the ports of the ball 59, and thence by way of the tube 61 to the tire 64. However, the ball 59 will be pressed firmly into engagement with the outer gasket 117, thus preventing escape of air between the sides of the socket 93 and the male coupling member 59.

A control head 126 is mounted upon a suitable standard 127 adjacent the after end of the runway 21, i. e. that end of the runway from which a car is driven thereupon. Accordingly, as an automobile is driven upon the runway it must pass the control head 126, which is disposed in such position that a control handle 128 which is mounted upon the control head 126 is easily accessible to the hand of the driver of the automobile, without the necessity of his leaving the driver's seat. The control handle 128, which is illustrated in detail upon Fig. 15, comprises a handle portion 129 and a dial portion 131 carrying graduations 132 and indicia 133 associated therewith. These indicia are preferably numerals ranging say from 25 to 45 inclusive, this representing the maximum range of pressures to which the various sizes of pneumatic tires now commonly employed should be inflated. It should be understood, however, that the range of possible pressures may be varied so as to meet any particular set of circumstances—for example, if the machine is to be used in conjunction with vehicles carrying high pressure tires, or in conjunction with trucks equipped with tires which should be inflated to say 120 pounds per square inch, the inflating machine may be varied accordingly.

The operating handle 128 is carried by a stem 134 which is threaded into the housing 136 of a pressure regulating valve 137, (see Fig. 20) to which air under pressure is supplied by means of a conduit 138. This air is supplied to the conduit 138 from a suitable reservoir tank 139, which receives its air under suitable pressure from a conventional compressor (not shown). It is intended that the pressure within the reservoir tank 139 be maintained automatically between certain limits, say between 120 and 170 pounds per square inch. However, inasmuch as the regulating mechanism and the compresser constitute no portion of the present invention, they have not been illustrated or described herein. From the reservoir tank 139 a conduit 141 leads to a filter 142, which is adapted to strain dust, moisture and oil particles from the air passing therethrough. From the other side of the filter 142 a conduit 143 leads to a regulating valve 144, whereby air is admitted to a conduit 146 at reduced pressure, preferably about 100 pounds per square inch, regardless of the pressure within the reservoir tank 139. Interposed between the conduit 138 and the conduit 146 is a pulsating valve 147 whereby an intermittent flow of air from the conduit 146 is admitted to the conduit 138.

This pulsating valve, which is illustrated in detail upon Figs. 17, 18 and 19, comprises a housing 151 having an inlet port 152 at one end, threaded to receive a complementary threaded end of the conduit 146. The port 152 enters a chamber 153 within the housing 151, from the opposite end of which a port 154 extends through a web 156. A valve 157 has its fluted stem 158 extending slidably through the port 154, and a coil spring 159 is under compression between the head of the valve 157 and a cap 161, which is threaded to the housing 151 over the port 154. The parts are so proportioned and arranged that the spring 159 presses the valve 157 onto a gasket 162 which encircles the port 154, with the result that air is not permitted to flow past the valve 157 when that valve is seated, but when the valve is unseated air may flow through the flutings 163 of the stem 158, and thence through a port 164 in the cap 161. This port 164 is threaded to receive a complementary threaded end of the conduit 138, so that whenever the valve 157 is unseated air is permitted to flow to the regulating valve 137 by way of the conduit 138.

Means are provided for vibrating the valve 157, so as to lift it from its seat 162 at regularly and rapidly recurring intervals, thereby permitting a pulsating flow of air therepast. This means comprises a rod 166 extending transversely from the interior of the chamber 153 to the exterior of the housing 151 through a diaphragm chamber 167, and thence through an elongated aperture 168 in a head 169 which is threadedly secured to a side of the housing 151. A diaphragm 171 is gripped throughout its periphery between an annular flange 173 of the cap 169 and an annulus 174, which is slipped into the threaded opening 176 in the side of the housing 151, into which the annular flange 173 is threaded. Another diaphragm 177 is gripped throughout its periphery between the annulus 174 and an annular shoulder 178 adjacent the bottom of the opening 176. The rod 166 is pivotally supported upon a pin 179 which extends diametrically of, and which is secured rigidly to the annulus 174, the parts being so proportioned and arranged that the inner end 181 of the rod 166 is in engagement with the end of the valve stem 158, whereas the outer end 182 of the rod 166 is pressed towards a cam 183 by means of a coil spring 184 (see Fig. 20). Instead of being in direct frictional engagement with the cam 183, however, the end 182 of the rod 166 carries a movable sleeve 185 which presses against the cam 183. The diaphragms 172 and 178 are firmly attached to the rod 166, preferably upon opposite sides of the pin 169, by means of jam nuts 186 and 187, respectively, which may be tightened so as to press their respective diaphragms against a collar 188 encircling the rod 166, and through which the pin 179 extends. Thus it may be seen that when the outer end 182 of the rod 166 moves downwards, as viewed upon Fig. 18, the inner end 181 will be swung upwards, carrying with it the valve 157, because of the engagement of the stem 158 thereof with the end 181. However, leakage of air from the housing 151 through the aperture, by means of which the operating rod 166 gains entrance to the housing, is positively precluded through the expedient of the diaphragms 172 and 177. Heretofore it has been practically impossible to provide a valve for controlling the flow of high pressure air which did not permit at least a small percentage of leakage from the housing of the valve through the aperture through which the operating rod or stem of the valve extends. However, this difficulty has been positively overcome by means of a valve designed in accordance with the description hereinabove.

The cam 183 is in the form of an eccentric carried by a shaft, illustrated diagrammatically at 191 upon Fig. 20. This shaft also carries a worm gear 192 and a disk 193 of insulating material, so that the cam 183, the worm wheel 192, and the disk 193 all are rotated simultaneously, by means of a worm 194 which is carried by the shaft 196 of an electric motor 197. Thus, it may be seen that whenever the motor 197 is energized the cam 183 will be rotated, producing a vibratory pivotal motion of the rod 166, and accordingly a periodic unseating of the valve 117, whereby a pulsating flow of air is admitted to the conduit 138 from the pressure reducing valve 144.

The conduit 138 leads to a chamber 201 within the housing 202 of the pressure regulating valve 137. Communication between the chamber 201 and another chamber 203 in the housing 202 is normally broken by means of a valve 204 which is pressed by a spring 206 toward its seat 207. The spring 206 is under compression between the valve 204 and a diaphragm 208 which extends across the chamber 203. The stem 134 presses against the opposite side of the diaphragm 208, with the result that when rotary motion is imparted to the operating handle 128 the stem 134 will be moved axially with respect to the housing 202, and thus vary the force exerted by the coil spring 206 against the valve 204. That side of the chamber 203 which is upon the opposite side of the diaphragm 208 from the valve 204 is in communication with the atmosphere through a plurality of ports 209, permitting unrestricted movement of the diaphragm 208, without building up or decreasing the pressure against the outer face of the diaphragm. However, the only outlet from the side of the chamber 203 with which the valve 204 is associated is through a conduit 211, which leads to a cylinder 212, preferably mounted within the control head 126. A piston 213 is reciprocable within the cylinder 212, and its rod 214 extends out of the cylinder 212 into engagement with a side of a pivotally mounted rod 216 of a valve 217 similar in construction to the valve 147 previously described, inasmuch as it is provided with the diaphragm construction preventing any escape of air through the aperture through which the rod 216 enters the valve housing. The rod 216 is normally retained in that position in which the valve 217 is open, by means of a coil spring 218, but is adapted to be moved to valve closing position when pressure is supplied to the cylinder 212, forcing the piston 213 to its outer extremity of movement. A bleeder valve 219 is provided at the pressure end of the cylinder 212 to permit slow retrograde movement of the piston 213 and the valve-controlling rod 216 subsequent to closing off the supply of air under pressure to the cylinder 212.

From the conduit 138 a line 221 leads to the inlet side of the valve 217, and from the outlet side of the valve 217 a conduit 222 leads. This is the line with which each of the conduits 104 is connected, these conduits 104 being in communication with the sockets 93 of the inflating head blocks 98, as explained hereinabove. Consequently, whenever the motor 197 is energized, effecting rotation of the cam 183 and consequent pulsation of the valve 147, and when the valve 217 is open, pressure will be supplied to the valves 106 of all the inflating heads, through the conduit 222.

Energization of the motor 197 is effected by means of conductors 226 and 227, which lead to supply conductors 228 and 229 respectively. However, a pair of switches 231 and 232, connected in series with each other, are interposed within the conductor 227, requiring that both switches 231 and 232 be closed before the motor 197 is energized. A jack 233 is also connected in series with the switches 231 and 232, the circuit across this jack being closed by means of a conductor plug 234, which, however, may be removed to permit insertion of a different type of plug, whereby additional switches (not shown) may be connected in series with the switches 231 and 232. The switches 231 and 232 are disposed in the runway 21 in the depression 32 therein, in such position that when a wheel is disposed within the depression both switches 231 and 232 will be engaged, thereby closing their associated electrical circuits, and effecting energization of the motor 197. However, the diagram upon Fig. 20 illustrates but a single pair of opposed inflating heads, it being understood that this type of machine is employed to inflate first the front tires, and subsequently the rear tires of an automobile. Consequently, there is but a single depression in each channel of the runway. However, if the device is to be constructed as illustrated upon Figs. 1 to 3 inclusive, employing two pair of opposed inflating heads, then I prefer to employ additional switches in the depression 33 in the movable portion of the runway, with the result that the motor 197 will not be energized until both front and rear wheels of the vehicle are properly positioned in alignment with their associated inflating heads. When it is desired to use but a single pair of opposed inflating heads the plug 234 should be inserted into the jack 233, closing the circuit across the terminals of the jack, and making it possible to energize the motor 197 instantly upon closing of both switches 231 and 232.

Thus it may be seen that as soon as a car comes to rest with one of its wheels disposed in the depression 32 the motor 197 will be energized, as hereinabove explained, causing operation of the pulsating valve 147, which will admit air under pressure to the conduit 138. Inasmuch as the valve 217 is normally retained open by the spring 218, the same pressure will be transmitted to the conduit 222, from which a branch conduit 241 leads to a cylinder 242, within which a piston 243 is reciprocable. The rod 244 of this piston 243 engages the operating rod 246 of another valve 247, which is also similar in construction to the valve 147 previously described. The operating rod 246 is normally retained in valve closing position by a spring 248. However, when the piston 243 is forced downwards within its cylinder 242 by pressure supplied to the upper end of the cylinder, the rod 246 will be moved to that position in which its valve 247 opens. Relatively high pressure air is fed to the intake side of the valve 247 by a conduit 249 which leads to the conduit 143. This conduit 143 is between the pressure reducing valve 144 and the supply reservoir 139, with the result that the air supplied to the valve 247 by the conduit 249 is under considerably higher pressure than that which is supplied to the pulsating valve 147, and thence to the socket blocks 91. However, the pressure of the air admitted to the valve 247 is retained within relatively close limits, regardless of the fluctuations of pressure within the supply reservoir 139, by means of a regulating valve 250, which preferably is so adjusted that it permits air to be fed to the valve 247 at substantially 75 pounds per square inch. From the outlet side of the valve 247 a conduit 251 leads to each of the inflating heads, and is connected to both of the conduits 76, with the result that whenever the valve 247 is open, pressure will be supplied to all of the cylinders 68 of the inflating heads, causing the plungers 69 thereof to be forced inwards toward the runway 21, as explained hereinabove.

Since the motor 197 will be energized as long as a wheel of the car is resting within the depression 32, means are provided for automatically closing off the supply of air to the conduit 222, whereby the air is led to the socket blocks 91 of the inflating heads when the air within that conduit has reached a predetermined pressure. The pressure at which this portion of the device will operate is predetermined by the setting of the operating handle 128 which, as explained hereinabove will effect variation of the amount of pressure exerted by the spring 206 against the valve 204. Inasmuch as the conduits 221 and 222 are in communication with each other during inflation of the tires, through the open valve 217, and in further view of the fact that the conduits 221 and 138 are in communication with each other, the pressure within the chamber 201 of the pressure regulating valve 137 will be the same as that within the conduit 222. Obviously, however, this pressure is continually increasing, owing to the continued opening and closing of the pulsating valve 147 admitting air periodically in small quantities from the supply conduit 146. The pressure of the air within the chamber 201 is exerted against the valve 204 in the direction opposite to that in which the valve 204 presses against the seat 207. Consequently, when the pressure within the chamber 201 becomes sufficient to overcome the action of the spring 206, the valve 204 will be unseated, admitting air to the chamber 203, whence it will be led to the cylinder 212 by way of the conduit 211. As soon as this occurs, the piston 213 will be forced downwards, carrying the valve operating rod 216 into that position in which the valve 217 is closed, thereby preventing the admission of any air to the conduit 222, and causing cessation of the inflation of the tires. The motor 197, however, continues to operate, inasmuch as the vehicle remains stationary, with one wheel thereof within the depression 32. Consequently, the pulsating valve 147 will continue to operate, admitting the same quantities of air to the conduit 138, with the result that the pressure therein will build up a great deal more rapidly, forcing the valve 204 further from its seat, and pressing the piston 213 downwards with greater force, thus insuring that the valve 217 is tightly closed, preventing all possibility of leakage of air from the conduit 221 to the conduit 222.

A branch conduit 256 leads from the conduit 251 to another valve 257, which is also constructed similarly to the valve 147. The outlet 258 of the valve 257 is open to the atmosphere, but the valve 257 is normally retained closed, by means of a coil spring 259, which urges the operating rod 261 of the valve 257 into that position into which the valve 257 is closed. The operating rod 261 is engaged by the rod 262 of a piston 263, which is reciprocable within a cylinder 264, to which air is led by a branch conduit 266 which leads from the conduit 222. Accordingly, as soon as pressure is supplied to the conduit 222, the piston 263 will be thrust downwards, tightly closing the relief valve 257. As soon as the pressure within the conduit 222 decreases, however, the piston 263 will rise, through the action of the coil spring 259, opening the valve 257 and permitting pressure within the conduit 251 to bleed off. However, the spring 248 is stronger than the spring 259, and since their associated cylinders 242 and 264, respectively, are both in communication with the conduit 222, the valve 257 will not open until after the valve 247 has closed. Hence, as soon as the relief valve 257 opens, the pressure within the conduit 251 will fall off to atmospheric, permitting the springs 82 of each of the inflating heads to retract that head, pulling the socket blocks 91 away from the male coupling members 59 on the wheels of the automobile, so that the automobile can then be moved. Inasmuch as this retraction of the inflating heads is dependent upon falling away of the pressure within the conduit 222, a bleeder valve 267, preferably in the form of a pet cock, communicates with the interior of the cylinder 264. This bleeder valve 267 is continually open to such an extent that a relatively slow leakage of air is permitted therethrough, so that as soon as the valve 217 is closed the pressure within the conduit 222 will gradually fall away, permitting the pistons 243 and 263 to be moved to retracted position.

As soon as the inflating heads have been withdrawn, the car should be either advanced upon the runway 21, so as to position the other wheels thereof in alignment with the inflating heads, or it should be completely removed from the runway. Obviously, this will permit both switches 231 and 232 to open, breaking the circuit whereby current is conducted to the motor 197, and causing cessation of the operation of the pulsating valve 147. However, inasmuch as there would otherwise be a possibility for the pulsating valve 147 to come to rest in open position, the disk 193 is used to supply energy to the motor 197, except when the valve 147 is tightly closed. This disk 193 of insulating material carries a sector plate 271 of conducting material, which is frictionally engaged by a pair of brushes 272 and 273. The brush 272 is connected by a conductor 274 to the supply conductor 229, whereas the brush 273 is connected by a conductor 276 to the conductor 227 between the motor 197 and the switches 231, 232. The disk 193 is so positioned upon the shaft 191 that both brushes 272 and 273 are in contact with the sector plate 271 whenever the valve 147 is open. Consequently, should the motor 197 be de-energized by opening of the switches 231 and 232 at such a time that the motor 197 would come to rest with the valve 147 open, current will be supplied to the motor 197 through the sector plate 271 and the brushes 272 and 273, causing the motor 197 to continue to operate long enough to effect closing of the valve 147, with the result that all possibility of leakage of air to the conduits 138 and 221, except when both switches 231 and 232 are closed, is positively precluded.

The parts of the regulating valve 137 are so proportioned and arranged that when the pressure within the chamber 201 expressed in pounds per square inch, reaches the number corresponding to the indicium 133, which has been brought into registry with a pointer 281 carried by the operating head 126, the valve 204 will be lifted from its seat. I have found, however, that pressure regulating valves are not absolutely constant in operation. For example, the regulator valve 144, if of convenient construction, will not maintain an absolutely constant pressure within the conduit 146, as the pressure within the supply tank 139 fluctuates. As mentioned hereinabove, the pressure within the supply tank 139 varies from substantially 120 to 170 pounds per square inch, and this fluctuation within the supply reservoir 139 will produce a fluctuation of from 3 to 5 pounds per square inch in the conduit 146. Such a condition is conducive to inaccuracy of operation of the inflating machine, because when the pressure within the supply conduit 146 is relatively high, even though only three or four pounds above normal, the rate at which air will be fed to the control valve will be materially increased, with the result that it will operate before the tires are fully inflated. Accordingly, I have provided means for compensating for any such inaccuracy of pressure beyond the pressure-regulating valve 144 from the supply reservoir 139. The pointer 281, instead of being stationary, is carried by the rotary shaft 282 of a conventional Bourdon tube gauge, indicated in its entirety at 283. Although this gauge 283 is of conventional construction, it should be explained that it comprises a flexible arcuate tube 284, affixed at one end 286 to the housing 287 of the gauge 283. The other end 285 of the tube 284 is connected to a lever 288, which is pivotally mounted, and which carries a toothed sector plate 289 which engages a gear 291 which is also carried by the shaft 282. When pressure is increased within the flexible tube 284 it tends to straighten out, causing the lever 288 and sector plate 289 to rotate in a counter clockwise direction, as viewed upon Fig. 15, turning the gear 291 and the shaft 282 and pointer 281 in a clockwise direction, as viewed upon that figure. The interior of the flexible tube 286 is in communication with the supply conduit 146, by means of a conduit 292, with the result that when the pressure within the supply conduit 146 is above normal, the pointer 281 will be moved slightly to the right, as viewed upon Fig. 15, with the result that when an operator wishes to set the machine to inflate to say 35 pounds, he will have to move the control handle 128, so as to position the indicium "35" slightly further to the right than is the case when the pressure within the conduit 146 is normal. Since motion of the control handle 128 in such a manner as to cause its indicia 133 to be moved to the right is that which will effect slower closing of the valve 204, the valve 204 will be closed slightly later than were the numeral "35" set into registry with the pointer 281 in its initial position, with the result that the supply of air to the conduit 222, and thence to the tires, will be discontinued slightly later in the cycle of operation of the machine when the pressure within the supply conduit 146 is above normal than when the pressure therein is normal; and the parts are so proportioned and arranged that the closing of the valve 204 occurs at such a time that the inaccuracy of the pressure within the supply conduit 146 is compensated for.

Another inaccuracy in the operation of the machine is apt to result when two or more tires being inflated simultaneously are initially inflated to different pressures. Say, for example, one of two tires being inflated at the same time carries 20 pounds per square inch, and the other carries 30 pounds per square inch, and the pressure to which it is desired to inflate is 35 pounds. Obviously, it will require a longer period of operation of the machine to inflate the tire in which the pressure is low, with the result that if that tire is fully inflated to 35 pounds the other tire will have been inflated to more than 35 pounds before the valve 217 is closed. Consequently, I have provided means for controlling the rate of flow of air to the supply pipe 146, this controlling means being in the form of specially constructed pressure reducing valve 144. The valve 144, which is illustrated in detail upon Fig. 16, comprises a housing 296, made up of two parts 297 and 298 threadedly joined in telescopic relationship, as indicated at 299. The section 297 of the housing 296 carries a large and a small diaphragm 301 and 302 respectively, both of which are connected by jam nuts 303 to an axially arranged stem 304. A head 306 on the stem 304 is pressed by a coil spring 307 into engagement with a diaphragm 308, which is carried by the other section 298 of the housing 296. The section 298 carries a valve 311, having a stem 312, a head 313 of which engages the diaphragm 308 on the opposite side thereof from the head 306 of the stem 304. The stem 312 extends through a web 314 of the section 298 of the housing, permitting the head 311 of the valve to engage an annular valve seat 316 on the under side of the web 314, against which it is resiliently urged by a coil spring 317 under compression between the valve 311 and the bottom 318 of the housing 296. The pressure which the spring 307 exerts against the diaphragm 308, and through it upon the valve 311, may be varied by altering the relative positions of the sections 297 and 298 of the housing 296, inasmuch as the upper end of the spring 207 presses against a web 319 in the section 297, and the diaphragm 308, against which the head 306 presses, is carried by the other section 298. Accordingly, the section 298 should be threaded into the section 297 far enough to impose the necessary pressure against the diaphragm 308 to attain the desired air pressure within the outlet conduit 146 which leads from the section 298 of the housing below the valve 311. The conduit 143 whereby air is conveyed to the pressure reducing valve 144 from the supply reservoir 139, leads into the housing 296 between the diaphragm 308 and the valve 311, with the result that air can flow from the conduit 143 to the conduit 146 only when the valve 311 is moved downwards away from its seat 316. The valve 311 and valve stem 312 are fluted, whereby this flow of air is permitted when the valve 311 is unseated. The relatively high pressure within the inlet conduit 143 is imposed upon the under side of the diaphragm 308, urging that diaphragm upwards against the action of the spring 307, which, however, is so adjusted that it retains the valve 311 unseated against this pressure imposed upon the diaphragm 308 until the pressure below the valve 311, and within the conduit 146, has reached that for which the regulating valve 144 has been set, whereupon the valve 311 will seat, thus maintaining a substantially constant pressure within the outlet conduit 146, regardless of the pressure supplied to the device through the inlet conduit 143. Another conduit 320 leads from the conduit 222 which is beyond the control valve 217 from the supply reservoir 139, and this conduit 320 enters the housing 296 of the pressure regulating valve 144 between the diaphragms 302 and 303. The larger of these diaphragms, namely the diaphragm 301, is above the smaller diaphragm 302, with the result that the greater the pressure within the conduits 222 and 320, the greater will be the tendency of the stem 304 to move upwards, i. e., in the direction of closing of the valve 311. Consequently, as the pressure within the conduit 222 builds up, gradually reaching the pressure for which the control handle 128 has been set, the valve 311 will be moved closer to its seat 316, thus restricting flow of air to the conduit 146, and thus decreasing the rate at which air is supplied to the tires being inflated. This will tend to give the least inflated tire time to be inflated to the desired pressure, even though the pressure of the air within the conduit 222, whereby air is supplied to both tires, is substantially equal to the desired pressure, with the result that the other tire, the initial pressure of which was greater, will not be inflated to a pressure above that for which the control handle 128 had been set.

Means are provided for giving an audible signal when retraction of the inflating heads has been completed, the purpose being to inform the driver of the automobile that he should move his car. If only the front or rear tires of the car, as the case might be, have been inflated, the driver should advance the car to permit the other tires thereof to receive proper inflation; and if all four tires have already been serviced the car should then be completely removed from the inflating machine. A transformer 321 is connected to the supply conductor 228 and to the conductor 227 which leads from the switches 231 and 232. Consequently, the transformer 321 is energized only when both switches 231 and 232 are closed. The secondary coil of the transformer 321 is connected by a suitable electrical circuit 322 to an electric bell 323. Also connected into the circuit 322 in series with the bell 323 and secondary coil of the transformer 321 are switches 324 and 325, which are so positioned upon the standards 66 of two opposed inflating heads that each is adapted to be closed when the associated head is withdrawn to retracted position. Consequently, only after the transformer 321 has been energized by the closing of the switches 231 and 232, movement of the inflating heads away from their associated standards 66 will open the circuit 322, causing the bell 323 to stop ringing. As soon, however, as the heads are fully retracted, the bell will start to ring, and continue so doing until the switches 231 and 232 are opened, which can be effected only by removal of the automobile from that position in which a wheel thereof is disposed within the depression 32 in the runway in which these switches are disposed.

Figs. 9 and 10 show a slightly modified form of inflating head. Here, the backing plate 72, the sliding plate 92, and the block 91, within which the sockets 93 are formed, are identical in construction with those of the previously described modification, and they are intended to be employed in conjunction with the same type of male coupling member 59 mounted upon the hub 57 of a wheel 58. Instead of being carried by a pneumatically operated plunger, however, the plate 72 is mounted upon a rod 326 which is reciprocably mounted within a sleeve 327 carried at the upper end of a standard 328, adapted to be mounted rigidly adjacent the runway of the inflating machine. A pedal 329 pivotally mounted upon the bracket 328 engages a roller 331 carried upon the outer end of the rod 326, in such a manner that when the pedal 329 is depressed the rod 326 will be pushed inwards toward the runway, advancing the block 91, so as to seat the male coupling member 59 within one of the sockets 93, as shown upon Fig. 10. Retraction of the plates 72 and 92, and the block 91, is effected by means of a coil spring 332. Air is supplied to all of the sockets 93 by a flexible conduit 333, which carries a manually controlled valve 334 and a visual pressure gauge 336. Thus it may be seen that this modification of inflating head is intended for manual operation, instead of being used in conjunction with the automatic inflating mechanism described hereinabove, and illustrated diagrammatically upon Fig. 20.

Still another form of inflating head is illustrated upon Figs. 11 to 14 inclusive. This modification is intended to be used in conjunction with a male coupling member 341, which instead of being mounted upon the hub of the vehicle wheel is mounted upon a lateral extension 342 of the valve stem 343, with the result that instead of being positioned axially with respect to the wheel it is adjacent the rim 344 thereof. For this reason the block 346 of this modification of the inflating head is annular in form, and is provided with a relatively large number of sockets 347 in its outer face, each of which is provided with one of the valves 106 described hereinabove. The valve 106 of each socket 347 is disposed in a passageway 348 leading into the block 346 from the apex of that socket, and all the passageways 348 are in communication with a supply tube 349 which is connected by a flexible conduit 351 to the conduit 222 of the automatic inflating mechanism, or to the manually controlled valve 334, in the event the annular block 346 is carried by the modification of the inflating head illustrated upon Figs. 9 and 10. The annular block 346 is mounted by means of a spider 352 upon a sliding plate 353, which is retained substantially centrally upon a backing plate 354 by a plurality of springs 356 in substantially the same manner as the mounting of the sliding plate 92 of the first described modification; and the backing plate 354 is mounted either upon the plunger 69, in the event this form of head is employed upon the automatic inflating device, or upon the rod 326, in the event it is employed upon the manually controlled inflating head.

Various changes may be made in the details of construction without departing from the spirit or scope of the invention as defined by the appended claims.

I claim:

1. A machine for inflating a pneumatic tire mounted upon a wheel of a vehicle and having inlet means extending laterally from said wheel and communicating with the interior of the tire, a runway adapted to receive said vehicle, an inflating head disposed beside said runway and comprising a backing plate mounted in a vertical plane, a block movable with respect to said plate and having a socket in its outer face adapted to receive said inlet means, means resiliently retaining said block substantially centrally of said plate, and means for advancing said plate and block toward said runway to seat said inlet means within said socket, and means for supplying air under pressure to said socket.

2. A machine for inflating a pneumatic tire mounted upon a wheel of a vehicle and having inlet means extending laterally from said wheel and communicating with the interior of the tire, a runway adapted to receive said vehicle, an inflating head disposed beside said runway and comprising a backing plate mounted in a vertical plane, a block movable with respect to said plate and having a socket in its outer face adapted to receive said inlet means, means resiliently retaining said block substantially centrally of said plate, and means actuated upon arrival of said wheel in a position upon said runway in alignment with said head for advancing said plate and block toward said runway to seat said inlet means within said socket, and means for supplying air under pressure to said socket.

3. A machine for inflating a pneumatic tire mounted upon a wheel of a vehicle and having inlet means extending laterally from said wheel and communicating with the interior of the tire, a runway adapted to receive said vehicle, an inflating head disposed beside said runway and comprising a backing plate mounted in a vertical plane, a block movable with respect to said plate and having a socket in its outer face adapted to receive said inlet means, said socket tapering inwards substantially to an apex and having a port leading inwards therefrom and a passageway communicating with said port, spring means normally retaining said block substantially centrally of said plate, and means for advancing said plate and block toward said runway to seat said inlet means within said socket, and means for applying air under pressure to said passageway.

4. A machine for inflating a pneumatic tire mounted upon a wheel of a vehicle and having inlet means extending laterally from said wheel and communicating with the interior of the tire, a runway adapted to receive said vehicle, an inflating head disposed beside said runway and comprising a backing plate mounted in a vertical plane, a plate movable thereupon, spring means supporting and resiliently retaining said movable plate substantially centrally of said first mentioned plate, a plurality of parallel links each pivoted at one end of said movable plate, a block pivotally supported substantially in parallelism with said plates upon the other ends of said links, means limiting motion of said block downwards and outwards from said plates, said block having a plurality of closely adjacent sockets in its outer face, each of said sockets tapering inwards substantially to an apex and having a port leading inwards therefrom, and a passageway communicating with all of said ports, and means for advancing said plates and said block toward said runway to seat said inlet means within one of said sockets, and means for supplying air under pressure to said passageway.

5. A machine for inflating a pneumatic tire mounted upon a wheel of a vehicle and having inlet means extending laterally from said wheel and communicating with the interior of the tire, a runway adapted to receive said vehicle, an inflating head disposed beside said runway and comprising a backing plate mounted in a vertical plane, a block movable with respect to said plate and having a socket in its outer face adapted to receive said inlet means, means resiliently retaining said block substantially centrally of said plate, and pneumatically operated means actuated upon arrival of said wheel in a position upon said runway in alignment with said head for advancing said plate and block toward said runway to seat said inlet means within said socket, and means for supplying air under pressure to said socket.

6. In a tire inflating machine, the combination of a runway adapted to receive a plurality of wheels having tires thereon, a source of air under pressure, connecting chucks for connecting said air source to said tires, and means actuated upon arrival of said wheels in predetermined position upon said runway for advancing and connecting said chucks to said tires.

In testimony whereof I have signed my name to this specification.

ELLIS EDMOND WHITE.